M. HOLCZER.
TRACTOR CONTROL.
APPLICATION FILED AUG. 13, 1919.
1,335,237.
Patented Mar. 30, 1920.
2 SHEETS—SHEET 2.
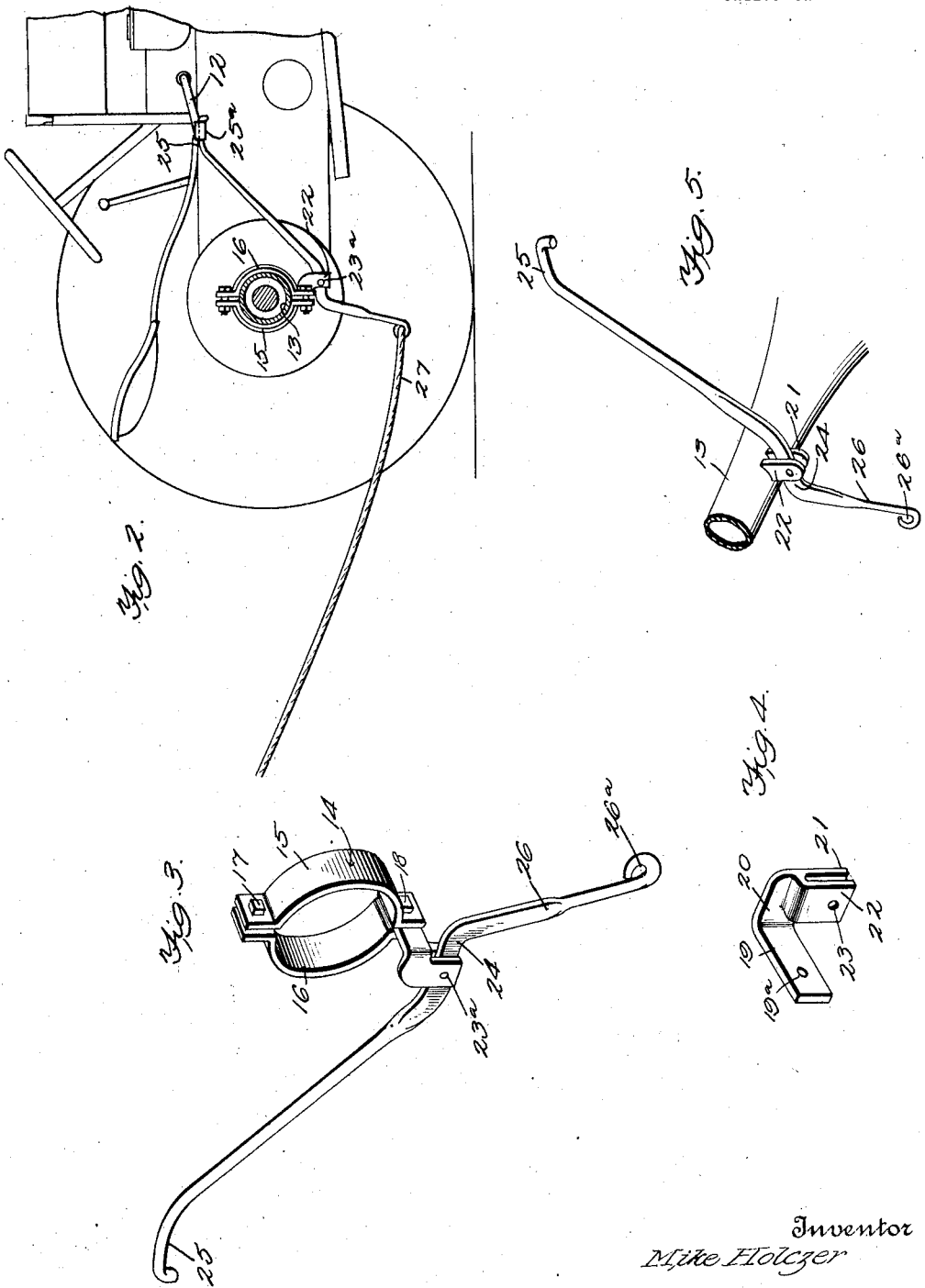

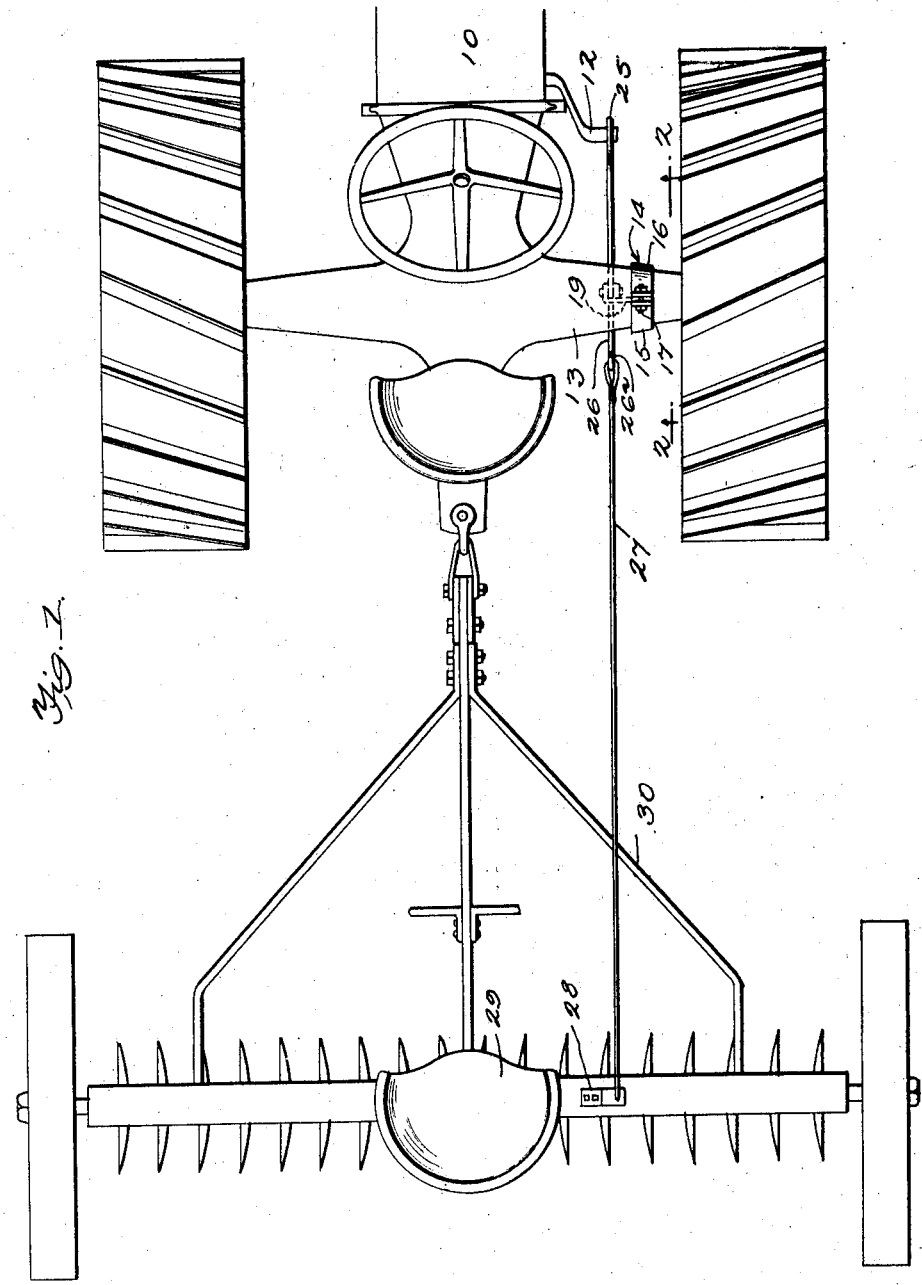

UNITED STATES PATENT OFFICE.

MIKE HOLCZER, OF NORFOLK, VIRGINIA.

TRACTOR CONTROL.

1,335,237.  Specification of Letters Patent.  Patented Mar. 30, 1920.

Application filed August 13, 1919. Serial No. 317,266.

*To all whom it may concern:*

Be it known that I, MIKE HOLCZER, a citizen of the United States, residing at Norfolk, in the county of Norfolk and State of Virginia, have invented certain new and useful Improvements in Tractor Control, of which the following is a specification.

This invention relates to improvements in control apparatus for tractors and more particularly to means whereby the clutch of the tractor may be thrown out of gear from a trailer drawn by the tractor.

Very often where a cultivator mowing machine, drill or other implement is being drawn by a tractor the driver of the tractor fails to notice large stones, stumps and the like, which could be observed by the man riding the trailer and operating the cultivator. In consequence the blades of the cultivator are often destroyed where had means been provided whereby the man riding the trailer could have stopped the tractor, this could have been avoided.

My invention provides means for throwing out the clutch of the tractor which may be operated by either the man driving the tractor or the man riding the trailer drawn by the tractor.

Other objects and advantages of the invention will be apparent during the course of the following description.

In the accompanying drawings forming a part of this specification, and in which like numerals are employed to designate like parts throughout the same:

Figure 1 is a plan view of the trailer drawn by a tractor embodying my invention;

Fig. 2 is a section taken on a line 2—2 in Fig. 1;

Fig. 3 is a perspective of the operating lever detached;

Fig. 4 is a perspective of the arm to which the operating lever is secured;

Fig. 5 is a perspective showing a slightly modified form in my invention.

Referring now more particularly to the drawings, numeral 10 indicates the clutch of the tractor. The clutch is provided with the usual clutch pedal 12. Secured about the axle housing 13 of the tractor is an attaching band 14. The band 14 comprises two similar semi-circular bands 15 and 16, having outstanding ears provided with openings which receive bolts 17 and 18. A lever attaching arm 19 is mounted between the pair of ears and secured by the bolt 18. This arm has an aperature 19$^a$ formed therein through which the bolt 18 extends. It is provided with extensions 20 which is down turned at its outer end 21 of which extends downwardly, and has secured thereto a second arm 22. The arms 21 and 22 being spaced apart and provided with alined openings 23.

The lever 24 is disposed intermediate the arms 21 and 22 and is provided with an opening adapted to register with the openings 23 formed in these arms. Through these openings extends a suitable pivot 23$^a$. The lever 24 is in the form of a bell crank, the arm 25 of which extends through a loop 25$^a$ formed in the clutch pedal 12. The other arm 26 of the bell crank is provided upon its end with an eye 26$^a$, to which is secured a cable or any other suitable flexible connection 27. This cable extends rearwardly to the trailer and is secured at a suitable point 28 adjacent to the seat 29 of the trailer 30.

In operation, if the operator of the trailer desires to stop the tractor he may readily do so by grasping the flexible element 27 and pulling thereon, thereby drawing out the clutch 10 of the tractor.

In a modified form shown in Fig. 5, the arms 21 and 22 forming the support for the lever 24 are formed integrally with the housing of the drive axle.

It is to be understood that the forms of my invention herein shown and described are to be taken as preferred examples of the same, and that various changes in the shape, size and arrangement of parts may be resorted to without departing from the spirit of the invention or the scope of the subjoined claim.

Having thus described my invention, I claim:

The combination with a tractor and a trailer drawn thereby, of a clutch on said tractor, an operating lever therefor, a band secured to the axle housing of said tractor, spaced arms carried by said band, a bell crank lever pivoted intermediate said arms, one arm of said bell crank lever being secured to said operating lever, an eye formed upon the other arm of said bell crank lever, and a flexible element secured in said eye and extending rearwardly to said trailer.

In testimony whereof I affix my signature in presence of two witnesses.

MIKE HOLCZER.

Witnesses:
 EDWARD BROCKENBROUGH,
 WM. W. OLD, Jr.